(12) United States Patent
Nagayasu et al.

(10) Patent No.: US 9,550,440 B2
(45) Date of Patent: Jan. 24, 2017

(54) CONVEYANCE SEAT

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Hidetaka Nagayasu, Aichi-ken (JP); Kohshi Katoh, Kanagawa-ken (JP); Eishi Takeuchi, Shizuokai-ken (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/516,732

(22) Filed: Oct. 17, 2014

(65) Prior Publication Data
US 2015/0108806 A1    Apr. 23, 2015

(30) Foreign Application Priority Data
Oct. 18, 2013  (JP) .................................. 2013-217503

(51) Int. Cl.
*B60N 2/72*   (2006.01)
*B60N 2/39*   (2006.01)
*B60N 2/70*   (2006.01)

(52) U.S. Cl.
CPC . *B60N 2/72* (2013.01); *B60N 2/39* (2013.01); *B60N 2/7094* (2013.01)

(58) Field of Classification Search
CPC ............. A47C 7/14; A47C 9/002; A47C 3/02; B60N 2/39; B60N 2002/0212; B60N 2/02; B60N 2/72; B60N 2/7094

USPC ............ 297/314, 284.3, 452.52, 452.55, 337
See application file for complete search history.

(56) References Cited

U.S. PATENT DOCUMENTS 3,632,076 A * 1/1972 Rogers, Jr. .................... 248/636
4,095,770 A * 6/1978 Long ........................ B60N 2/39
                                                         248/371

(Continued)

FOREIGN PATENT DOCUMENTS

CN   102717727   10/2012
CN   103978918   8/2014

(Continued)

OTHER PUBLICATIONS

Extended European Search Report for EP14189152.3 dated Feb. 26, 2015.

(Continued)

*Primary Examiner* — Milton Nelson, Jr.
(74) *Attorney, Agent, or Firm* — Greenblum & Bernstein, P.L.C.

(57) ABSTRACT

A conveyance seat includes a seat frame; a seat pad; and a support body disposed based on a center portion of a distribution of a sitting pressure applied by a seated occupant to the seat pad. The support body is supported with respect to the seat frame such that a front end portion thereof is rotatable in a right-left direction about a straight line tilted upward in a direction from a front side toward a rear side, and a rear end portion thereof is movable in the right-left direction. The seat pad includes a fixed portion that is supported at a fixed position by the seat frame, and a movable portion that is supported by the support body such that the movable portion is movable.

7 Claims, 8 Drawing Sheets

(56) References Cited

U.S. PATENT DOCUMENTS

| | | | | |
|---|---|---|---|---|
| 4,183,492 | A * | 1/1980 | Meiller | 248/395 |
| 4,500,062 | A * | 2/1985 | Sandvik | 248/371 |
| 4,515,337 | A * | 5/1985 | Torras | 248/371 |
| 5,976,097 | A | 11/1999 | Jensen | |
| 6,019,422 | A * | 2/2000 | Taormino et al. | 297/195.1 |
| 7,134,721 | B2 * | 11/2006 | Robinson | 297/284.3 |
| 7,137,669 | B2 * | 11/2006 | Nagayama | 297/452.49 |
| 2008/0167587 | A1 | 7/2008 | Chen | |
| 2012/0169099 | A1 * | 7/2012 | Horiguchi et al. | 297/314 |
| 2014/0225407 | A1 | 8/2014 | Nagayasu | |

FOREIGN PATENT DOCUMENTS

| | | |
|---|---|---|
| JP | 58-114162 | 8/1983 |
| JP | 05-1344 | 1/1993 |
| JP | 2000-318498 | 11/2000 |
| JP | 2001-277913 | 10/2001 |
| JP | 2005-349956 | 12/2005 |
| JP | 2008-044418 | 2/2008 |
| JP | 4095583 | 3/2008 |
| JP | 2014-151766 | 8/2014 |
| JP | 2014-169067 | 9/2014 |
| WO | 2007/016625 | 2/2007 |
| WO | 2013/021497 | 2/2013 |
| WO | 2013/088826 | 6/2013 |

OTHER PUBLICATIONS

Japanese Office Action for JP App. No. 2013-217503 issued on Apr. 28, 2015, along with English-language translation thereof.

Official Action, including a partial English-language translation thereof, for CN Appl. No. 201410554073.5 dated May 31, 2016.

* cited by examiner

CONVEYANCE SEAT

INCORPORATION BY REFERENCE

The disclosure of Japanese Patent Application No. 2013-217503 filed on Oct. 18, 2013 including the specification, drawings and abstract is incorporated herein by reference in its entirety.

BACKGROUND OF THE INVENTION

1. Field of the Invention

The invention relates to a conveyance seat including a seat frame serving as a frame that supports a load of a seated occupant, and a seat pad that is disposed on the seat frame, and flexibly receives the load of the seated occupant.

2. Description of Related Art

When an occupant is seated in the same posture on a conveyance seat for a long time, the degree of tiredness of the occupant increases. Thus, Japanese Patent No. 4095583 describes a seat that allows a seated occupant to easily change his or her seated posture. In the seat, a seat cushion is able to be swung in a right-left direction with respect to a base member on a vehicle floor. As a result, the occupant can easily swing his or her body in the right-left direction while remaining in the seated posture. Thus, it is possible to promote blood circulation in the body to suppress an increase in the degree of tiredness.

However, in the seat described in Japanese Patent No. 4095583, the entire seat cushion is able to be swung in the right-left direction with respect to the base member, and therefore, the seated posture of the occupant is unstable, and thus, the seat is not comfortable.

SUMMARY OF THE INVENTION

In view of the above, the invention provides a conveyance seat that holds the body of an occupant and allows the occupant to partially move his or her body easily so that the seated posture of the occupant is stably maintained and blood circulation in the body is promoted to suppress an increase in the degree of tiredness.

An aspect of the invention relates to a conveyance seat including: a seat frame serving as a frame that supports a load of a seated occupant; a seat pad that is disposed on the seat frame, and flexibly receives the load of the seated occupant; and a support body disposed based on a center portion of a distribution of a sitting pressure applied by the seated occupant to the seat pad. In the conveyance seat, the support body is supported with respect to the seat frame such that a front end portion of the support body is rotatable in a right-left direction about a straight line tilted upward in a direction from a front side toward a rear side, and a rear end portion of the support body is movable in the right-left direction; and the seat pad includes a fixed portion that is supported at a fixed position by the seat frame, and a movable portion that is supported by the support body such that the movable portion is movable. According to the above-described aspect, the fixed portion of the seat pad is supported at the fixed position by the seat frame, and therefore, the seated posture of the occupant can be stably maintained by the fixed portion of the seat pad. Further, the movable portion of the seat pad is supported by the support body such that the movable portion is movable, and therefore, the occupant can easily swing his or her body while remaining in the seated posture. Thus, the pelvis is turned about a portion near the lumbar spine, and a sitting pressure is changed. Accordingly, blood circulation in the body is promoted to suppress an increase in the degree of tiredness.

In the above-described aspect, the support body may include a spring body that is stretched and contracted along a support plane of the support body. In this configuration, since the support body includes the spring body, the support body can be used also as a spring body required in the seat frame. Further, since the support body includes the spring body, when a phase deviation occurs between the rotation angle of the front end portion of the support body and the moved position of the rear end portion of the support body, or when the front end portion is rotated and the rear end portion is linearly moved, the spring body can absorb the deviation.

In the above-described aspect, a cut portion that allows the movable portion to move in accordance with movement of the support body may be provided at a border portion between the fixed portion and the movable portion of the seat pad. In this configuration, when the movable portion of the seat pad moves relative to the fixed portion of the seat pad, the fixed portion and the movable portion are not likely to influence each other. Therefore, the fixed portion can be stabilized at the fixed position more easily, and the movable portion can be moved together with the support body more easily. Accordingly, it is possible to enhance the effect of suppressing an increase in the degree of tiredness by promoting the blood circulation in the body while stably maintaining the seated posture of the occupant.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
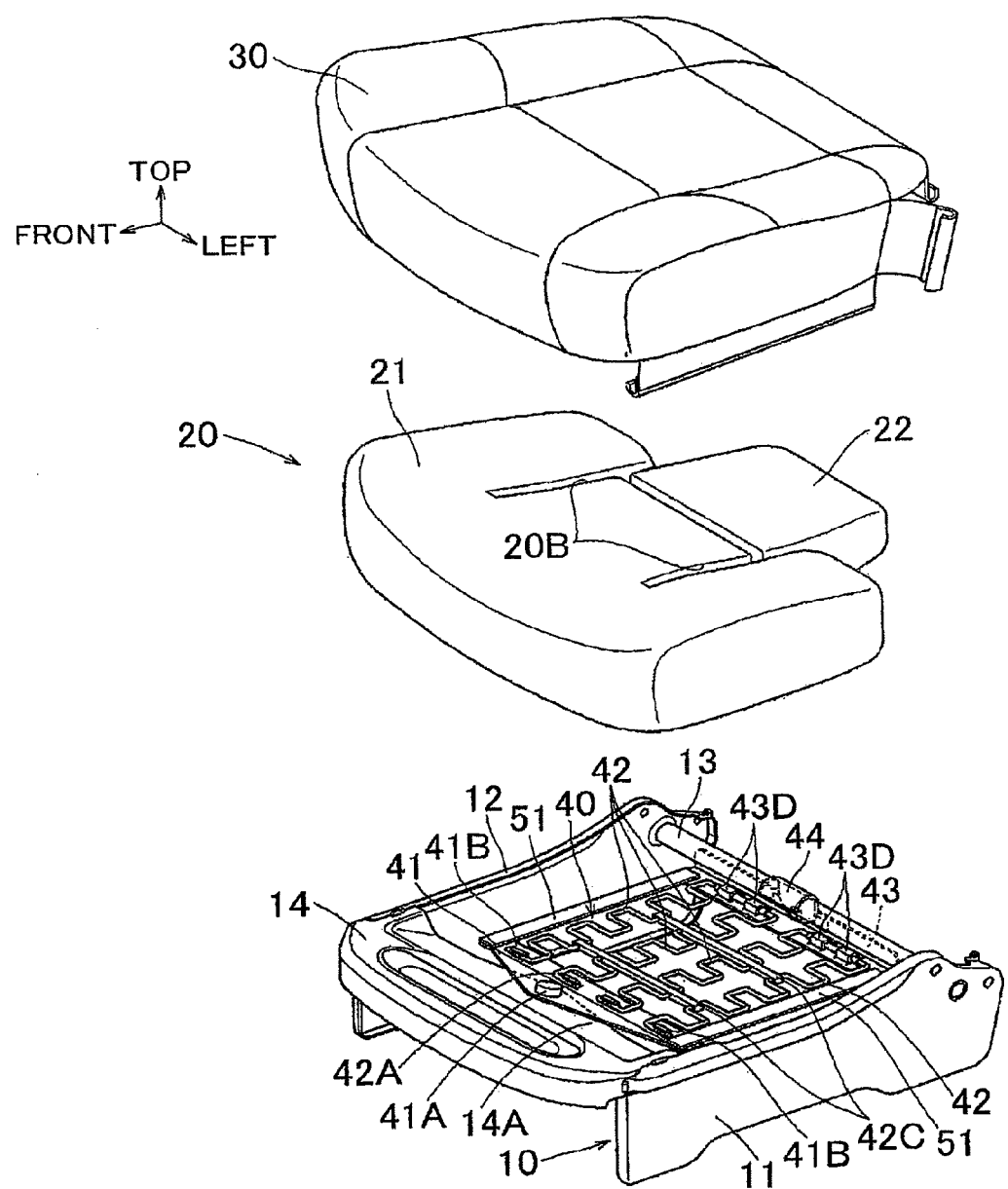
FIG. 1 is an exploded perspective view illustrating a first embodiment of the invention.
Figure 2:
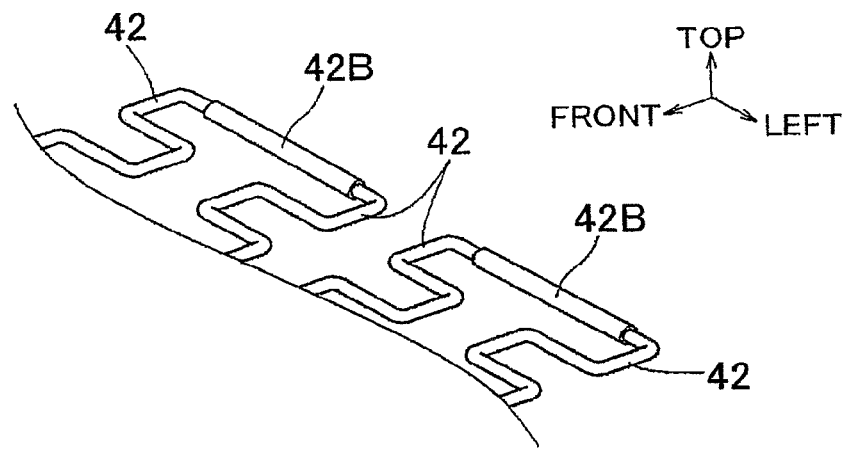
FIG. 2 is a partially enlarged perspective view illustrating the first embodiment of the invention.
Figure 3:
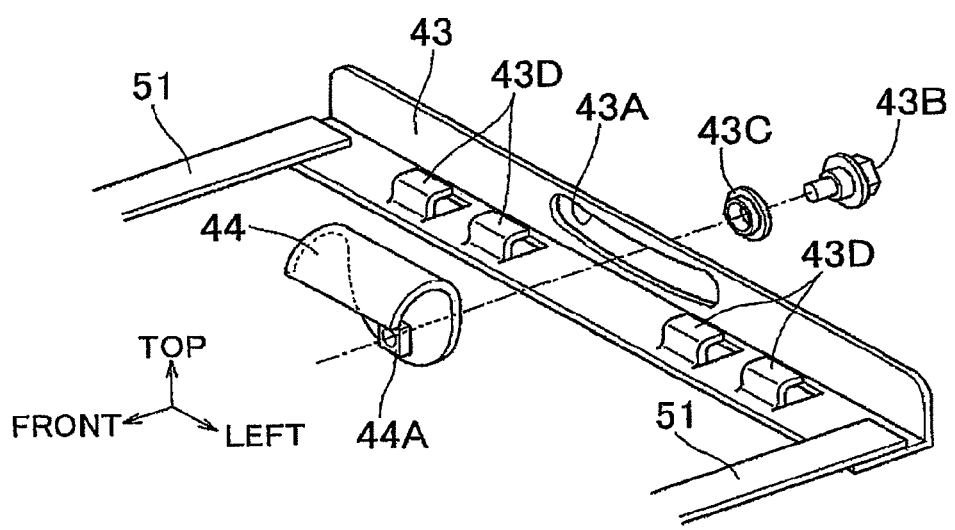
FIG. 3 is a partially enlarged exploded perspective view illustrating the first embodiment of the invention.
Figure 4:
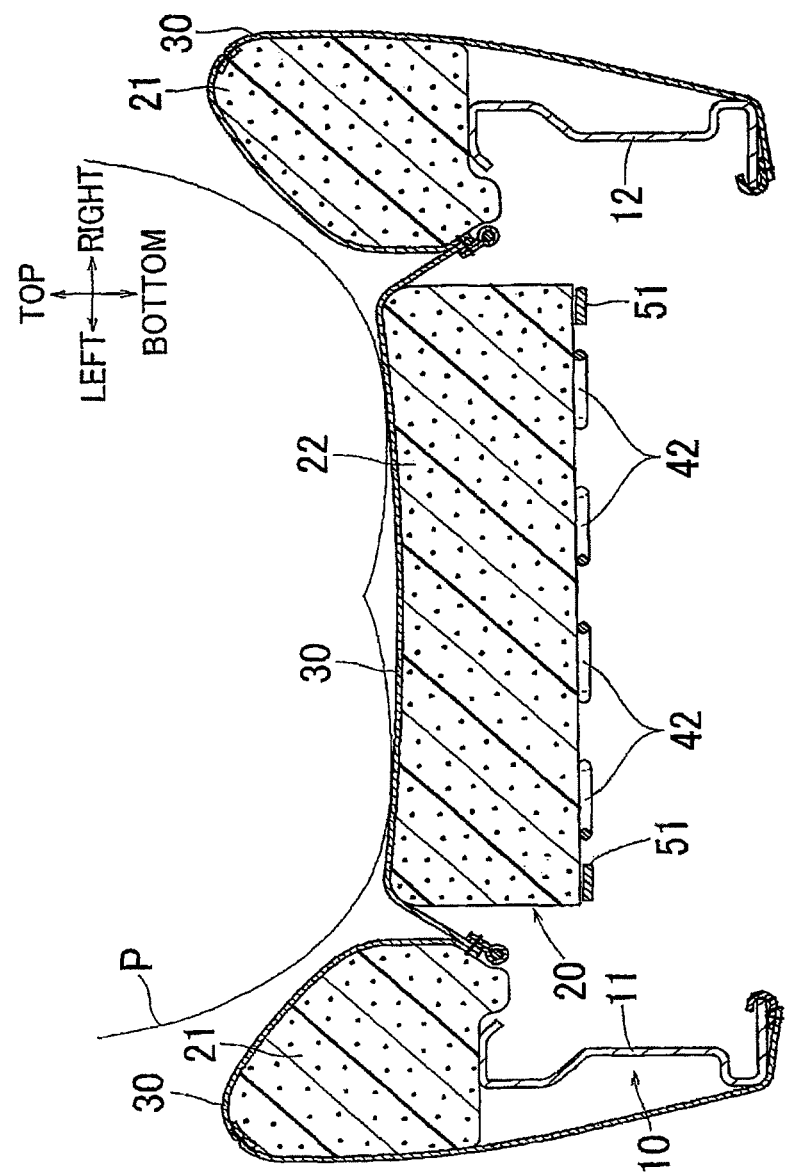
FIG. 4 is a vertical sectional view in a width direction illustrating the first embodiment of the invention.

A first embodiment of the invention will be described with reference to FIG. 1 to FIG. 6. In the first embodiment, the invention is applied to a seat cushion of a front seat of a vehicle. In each drawing, arrows indicate directions when the seat is provided in the vehicle. The seat cushion is formed by disposing a cushion pad 20 (that may be regarded as a seat pad according to the invention) that flexibly receives a load of a seated occupant, on a cushion frame 10

(that may be regarded as a seat frame according to the invention) serving as a frame that supports the load of the seated occupant, and covering the cushion frame 10 as in the cushion pad 20 with a cushion cover 30, as in a known vehicle seat in related art. The basic structure of the seat cushion is the same as that of a known seat cushion in related art, and thus, detailed illustration and description of the basic structure of the seat cushion will be omitted. The cushion frame 10 is formed by connecting a cushion panel 14 and a rear pipe 13 to right and left side frames 12, 11 by welding. The cushion panel 14 is welded to front ends of the right and left side frames 12, 11. The cushion panel 14, and upper end surfaces of the side frames 11, 12 form a surface that supports the cushion pad 20.

A tilted portion 14A is provided in a portion in a rear side of the cushion panel 14, the portion being located between the right and left side frames 12, 11. The tilted portion 14A is tilted downward in a rearward direction. A swinging piece 41 with a substantially triangle shape is fitted to a center portion of the tilted portion 14A in a right-left direction with use of a stepped hinge pin 41A such that the swinging piece 41 is able to be swung (rotated) in the right-left direction. Thus, the swinging piece 41 is swung (rotated) in the right-left direction about a rotation axis that is perpendicular to the tilted portion 14A. That is, the swinging piece 41 is supported such that the swinging piece 41 is able to be swung (rotated) in the right-left direction about the straight line tilted upward in a direction from the front side toward the rear side. In other words, the swinging piece 41 (i.e., a front end portion of a support body 40 to be described later) is tilted downward in the rearward direction. A portion of the swinging piece 41, which is located at a bottom side of the triangle shape, is bent to extend rearward in a horizontal direction. Portions of the plate surface of the bent portion are cut and raised to form four spring receivers 41B. In the swinging piece 41, the four spring receivers 41B are arranged in the right-left direction. Front ends of four S-shaped springs 42 (that may be regarded as a spring body according to the invention) engage with the respective spring receivers 41B.

A fixed bracket 44 is fixed, by welding, to a center portion of the rear pipe 13 in the right-left direction. An extended portion of the fixed bracket 44, which is disposed behind the rear pipe 13, extends downward. A spring bracket 43 is fitted to the extended portion of the fixed bracket 44, as clearly shown in each of FIG. 3 and FIG. 5. The spring bracket 43 is longer than the fixed bracket 44 in the right-left direction. The spring bracket 43 is a metal member that has an L-shaped cross-section. A sliding hole 43A is provided in an upper-side portion of the spring bracket 43 with the L-shaped cross-section. The sliding hole 43A has an arc shape. The sliding hole 43A is elongated in the right-left direction (i.e., extends in the right-left direction), and a center portion thereof is located at the lowest position. The spring bracket 43 is connected to the fixed bracket 44 with the use of a stepped bolt 43B that extends through the sliding hole 43A, such that the spring bracket 43 is slidable in the right-left direction. In this case, the stepped bolt 43B is fastened to a weld nut 44A such that a bush 43C is disposed between the stepped bolt 43B and an edge portion around the sliding hole 43A. The weld nut 44A is fixed to the fixed bracket 44 by welding. The bush 43C may be replaced by a bearing. Four spring receivers 43D are provided in a lower-side front portion of the spring bracket 43 with the L-shaped cross-section. The spring receivers 43D are similar to the spring receivers 41B of the swinging piece 41. The spring receivers 43D are oriented in a direction opposite to the direction in which the spring receivers 41B are oriented. The front ends of the four S-shaped springs 42 engage with the respective spring receivers 41B, as described above, and rear ends of the four S-shaped springs 42 engage with the respective spring receivers 43D. The swinging piece 41 is connected to right and left end portions of the spring bracket 43 by respective connection pieces 51, and the S-shaped springs 42 are disposed between the connection pieces 51.

The four S-shaped springs 42 consist of two pairs of the S-shaped springs that are arranged in the right-left direction. Rear end portions of the S-shaped springs 42 in each pair are bent toward each other. A buffer member 42B made of resin is provided on engagement portions in the rear end portions of the S-shaped springs 42 in each pair, the engagement portions engaging with the spring receivers 43D (refer to FIG. 2) so that the S-shaped springs 42 do not directly contact the respective spring receivers 43D. This suppresses occurrence of squeak noise when an occupant is seated. Further, an appropriate number of connection pieces 42C made of resin (two connection pieces 42C in FIG. 1) are provided to extend in the right-left direction across the four S-shaped springs 42 arranged in the right-left direction so that the S-shaped springs 42 are integrated with each other. The buffer members 42B and the connection pieces 42C are formed integrally with the S-shaped springs 42 by resin insert molding. The four S-shaped springs 42, the swinging piece 41, the spring bracket 43, and the connection pieces 51 form the support body 40. The support body 40 is disposed based on a center portion of a distribution of a sitting pressure.

Figure 5:
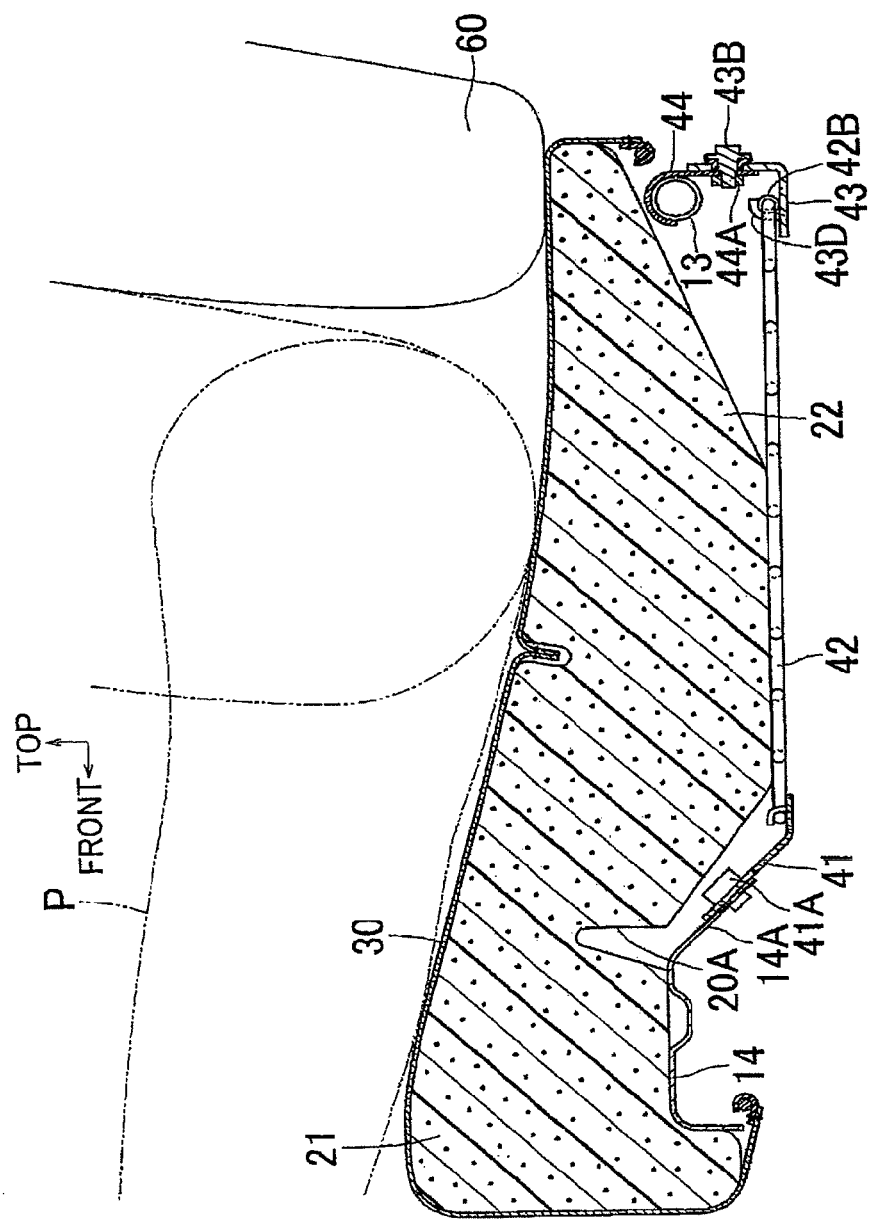
FIG. 5 is a vertical sectional view in a front-rear direction illustrating the first embodiment of the invention.

The cushion pad 20 is different from an ordinary cushion pad in that cut portions 20B extending in a direction from the rear side toward the front side are provided in right and left side portions in the cushion pad 20 (refer to FIG. 1). In a lower surface of the cushion pad 20, a cut portion 20A extending in the right-left direction is provided between front end portions of the cut portions 20B (refer to FIG. 5). As a result, the cushion pad 20 includes a fixed portion 21 that is disposed on the upper surfaces of the cushion panel 14 and the side frames 11, 12 of the cushion frame 10 and is supported at a fixed position, and a movable portion 22 that is disposed on the S-shaped springs 42 of the support body 40, and is supported so as to be movable. The fixed portion 21 and the movable portion 22 are formed as the cushion pad 20, that is, the fixed portion 21 and the movable portion 22 are formed as one unit. However, since the cushion pad 20 is partially divided by the cut portion 20A and the cut portions 20B, the fixed portion 21 is stably fixed on the upper surfaces of the cushion panel 14 and the side frames 11, 12, and the movable portion 22 is fixed on the support body 40 such that the movable portion 22 is able to be swung in the right-left direction. In each of FIG. 4 and FIG. 6, buttocks of the seated occupant are indicated by the reference sign P. In FIG. 5, a seat back is indicated by the reference numeral 60, and a lower limb of the seated occupant is indicated by the reference sign P.

When the seated occupant is seated on the vehicle seat with the above-described configuration, a femoral region of the occupant is supported on the fixed portion 21 of the cushion pad 20, and a most part of the buttocks of the occupant is supported on the movable portion 22 of the cushion pad 20. Therefore, the occupant is supported by the fixed portion 21, and the occupant can stably maintain the seated posture. Further, since the movable portion 22 is provided, the occupant can swing his or her body while remaining in the seated posture. Thus, the pelvis is turned about a portion near the lumbar spine, and the sitting pressure is changed. Accordingly, blood circulation in the body is promoted, and thus, an increase in the degree of tiredness is suppressed. More specifically, when the occupant seated on the seat cushion swings his or her upper body to the right and left, the S-shaped springs 42 of the support body 40 are swung in the right-left direction together with the swinging piece 41 and the movable portion 22 of the cushion pad 20. At this time, the spring bracket 43 provided integrally with the rear end portions of the S-shaped springs 42 are also moved in the right-left direction along the sliding hole 43A, together with, the swinging piece 41 and the S-shaped springs 42. In this case, since the sliding hole 43A has the arc shape, the support body 40 can be swung without warping the S-shaped springs 42. Therefore, the support body 40 is smoothly swung. Further, the sliding hole 43A with the arc shape is formed such that a center portion of the sliding hole 43A at a center position in the width of the support body 40 in the right-left direction is located at the lowest position. Therefore, the support body 40, which has been swung, receives a force for returning the support body 40 to the position at which the support body 40 is located before being swung, due to gravity received by the stepped bolt 43B via the support body 40. Accordingly, when the occupant is seated without swinging his or her upper body to the right and left, the support body 40 is maintained at a neutral position at which the support body 40 is not swung.

Figure 6:
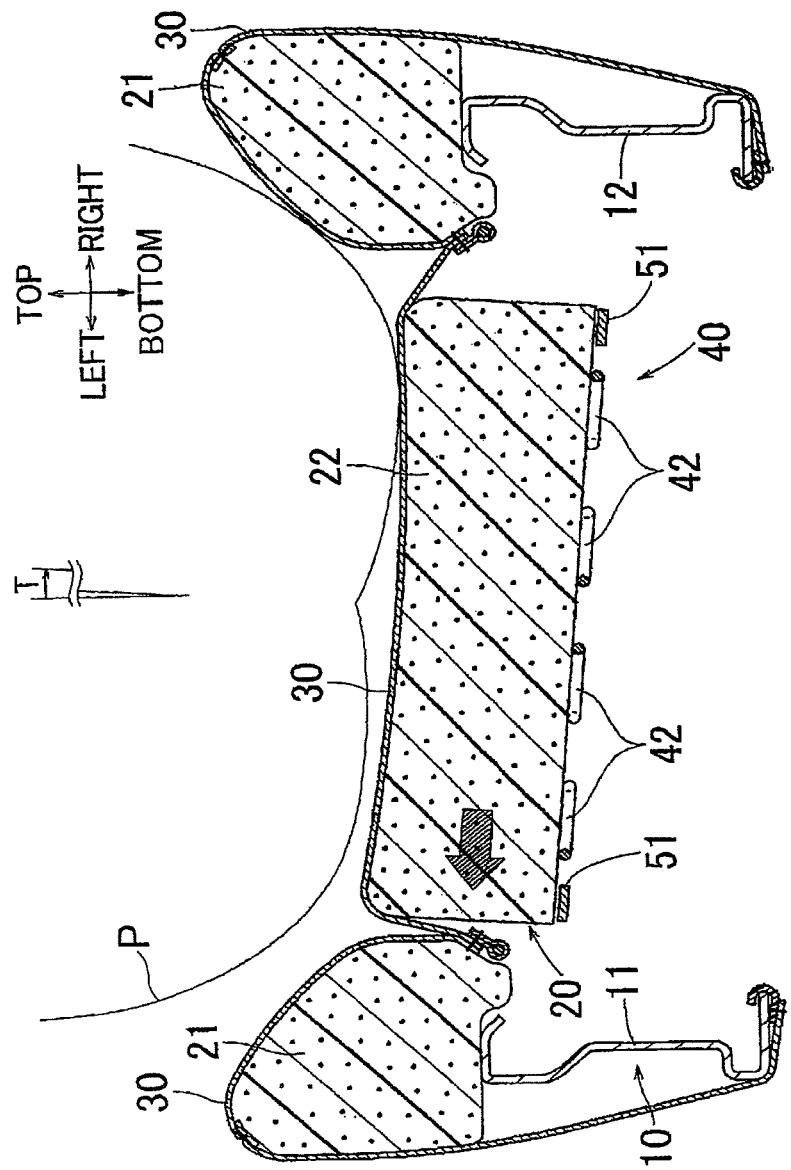
FIG. 6 is an explanatory view illustrating effects obtained in the first embodiment.

FIG. 6 illustrates a state in which the occupant P seated on the seat tilts his or her upper body to the right side as indicated by an arrow T. At this time, the movable portion 22 of the cushion pad 20 moves toward the upper left side together with the support body 40 as indicated by a shaded arrow. The left side of the buttocks of the occupant P moves upward so as to be away from the movable portion 22 (including the cushion cover 30). Thus, a contact pressure between the left side of the buttocks of the occupant P and the movable portion 22 decreases. When the occupant P seated on the seat tilts his or her upper body toward the left side opposite to the right side toward which the occupant P tilts his or her upper body in FIG. 6, the movable portion 22 moves toward the upper right side opposite to the side indicated by the shaded arrow, the right side of the buttocks of the occupant P moves upward so as to be away from the movable portion 22, and the contact pressure between the right side of the buttocks of the occupant P and the movable portion 22 decreases. Thus, when the occupant P seated on the seat swings his or her upper body in the above-described manner, and thus the contact pressure between the buttocks of the occupant P and the movable portion 22 is changed, a massaging effect on the buttocks of the occupant P is obtained, and blood circulation in the buttocks is promoted. Accordingly, it is possible to suppress an increase in the degree of tiredness of the body of the occupant P. Further, since the movable portion 22 moves to the right and left in accordance with the movement of the upper body of the occupant P as described above, the occupant P can easily move his or her upper body as if the occupant used an exercise machine. Thus, the blood circulation in the body is promoted due to an exercise effect, and an increase in the degree of tiredness is suppressed. The movable portion 22 and the fixed portion 21 are covered with the cushion cover 30, and thus, the movable portion 22 is connected to the fixed portion 21 with the use of the cushion cover 30. However, in this embodiment, when the movable portion 22 moves, the movable portion 22 can freely move without being pulled by the fixed portion 21 through the cushion cover 30, because the cushion cover 30 is more stretchable than an ordinary cushion cover.

Figure 7:
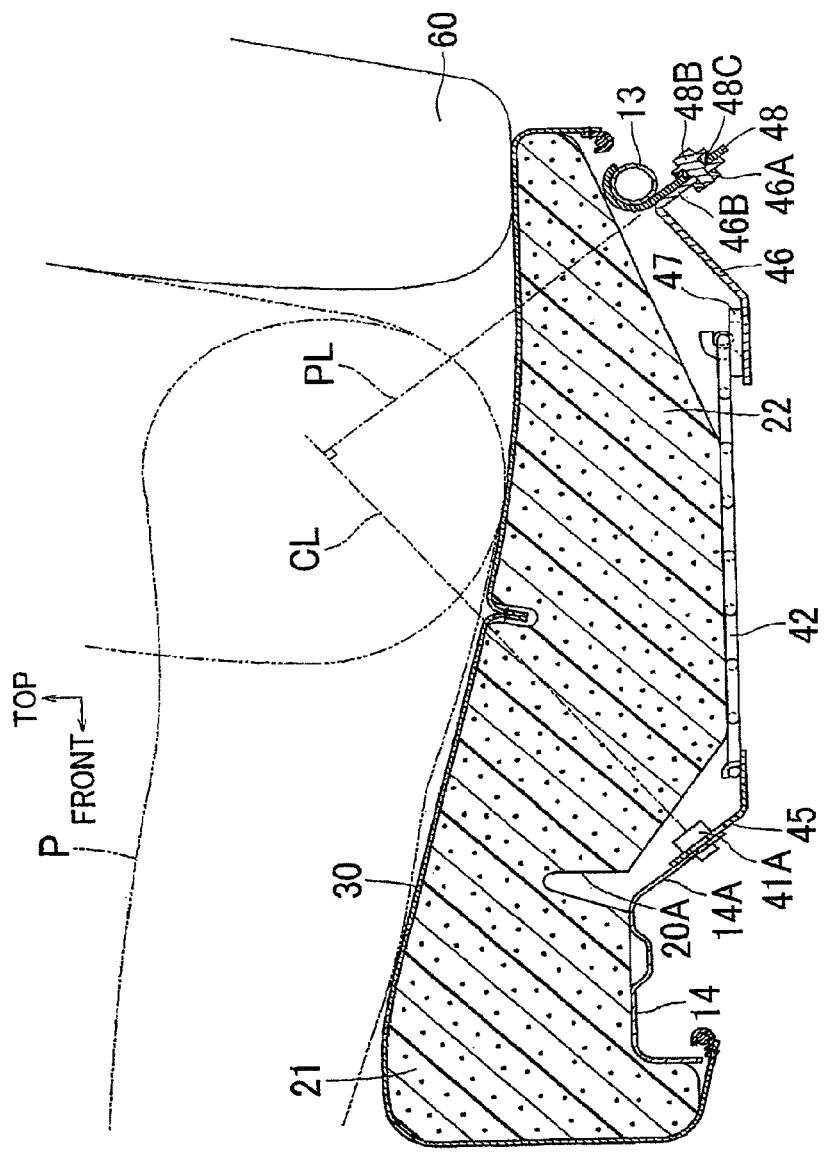
FIG. 7 is a vertical sectional view in the front-rear direction illustrating a second embodiment of the invention.
Figure 8:
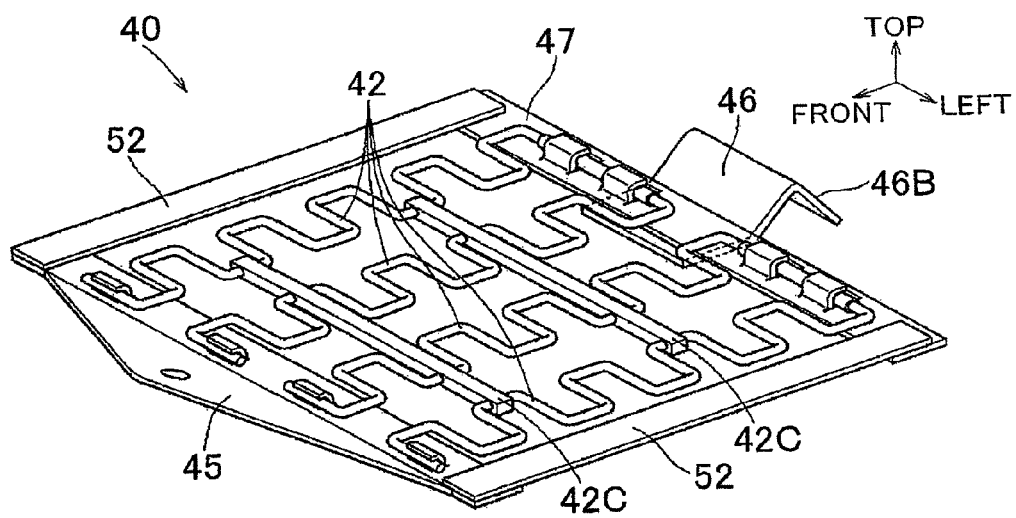
FIG. 8 is a perspective view illustrating a support body in the second embodiment.
Figure 9:
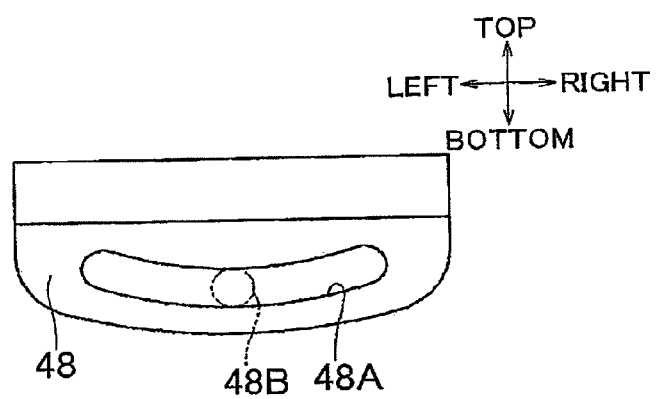
FIG. 9 is a front view illustrating a fixed bracket in the second embodiment.

A second embodiment of the invention will be described with reference to FIG. 7 to FIG. 9. The feature of the second embodiment is that the rear portion of the support body 40 is rotated, whereas the rear portion of the support body 40 is linearly moved in the first embodiment. The other portions of the configuration in the second embodiment are the same as those in the first embodiment. Therefore, the same portions are denoted by the same reference numerals or signs, and the repeated description thereof will be omitted. In each of FIG. 7 to FIG. 9, arrows indicate the directions when the vehicle seat is provided in the vehicle.

A fixed bracket 48 is fixed to the rear pipe 13 by welding. The fixed bracket 48 includes a portion extending along an upper portion to a front lower side of the rear pipe 13, and an extended portion that is extended and slightly tilted toward the rear side. As clearly shown in FIG. 9, in the extended portion, a sliding hole 48A that is elongated in the right-left direction (extends in the right-left direction) is provided. The sliding hole 48A has an arc shape, and extends along a swinging trajectory of the support body 40. FIG. 7 shows a rotation center line CL for a swinging piece 45 that is similar to the swinging piece 41 in the first embodiment. FIG. 7 also shows that the fixed bracket 48 is disposed along a plane PL that is orthogonal to the rotation center line CL. The rear ends of the S-shaped springs 42 engage with a second spring bracket 47 that corresponds to the spring bracket 43 in the first embodiment. A first spring bracket 46 is connected to the second spring bracket 47 by welding (refer to FIG. 7 and FIG. 8). The first spring bracket 46 includes a tilted portion 46B that is tilted downward in the rearward direction so as to be parallel to the tilt (inclination) of the swinging piece 45. In the first spring bracket 46, a weld nut 46A is fixed to the tilted portion 46B by welding. A stepped bolt 48B that extends through the sliding hole 48A of the fixed bracket 48 is fastened to the weld nut 46A. A bush 48C is disposed between the stepped bolt 48B and an edge portion around the sliding hole 48A to decrease friction resistance between the stepped bolt 48B and the edge portion around the sliding hole 48A. The swinging piece 45 is connected to right and left end portions of the second spring bracket 47 by respective connection pieces 52, and the S-shaped springs 42 are arranged between the connection pieces 52.

In the vehicle seat with the above-described configuration, when the occupant seated on the seat cushion swings his or her upper body to the right and left, the support body 40 is swung in the right-left direction, and the movable portion 22 of the cushion pad 20 is also swung, as in the first embodiment. At this time, the second spring bracket 47 is also guided by the sliding hole 48A of the fixed bracket 48 via the first spring bracket 46 and the stepped bolt 48B (in other words, the second spring bracket 47 is connected to the fixed bracket 48 via the first spring bracket 46 and the stepped bolt 48B). Therefore, the support body 40 is rotated about the rotation center of the stepped hinge pin 41A.

Accordingly, in the second embodiment, when the occupant seated on the seat swings his or her upper body to the right and left, the sides of the buttocks of the occupant alternately move upward to be away from the movable portion 22, and thus, the contact pressure between one side of the buttocks and the movable portion 22, and the contact pressure between the other side of the buttocks and the movable portion 22 alternately decrease, as in the first embodiment. As a result, the massaging effect on the buttocks of the occupant P is obtained, and the blood circulation in the buttocks is promoted. Accordingly, it is possible to suppress an increase in the degree of tiredness of the body of the occupant P. Further, the occupant P can easily move his or her upper body as if the occupant P used an exercise machine, and therefore, the blood circulation in the body is promoted due to the exercise effect, and an increase in the degree of tiredness is suppressed. At this time, the femoral region of the occupant is supported on the fixed portion 21 of the cushion pad 20, and the occupant P can stably maintain the seated posture.

Figure 10:
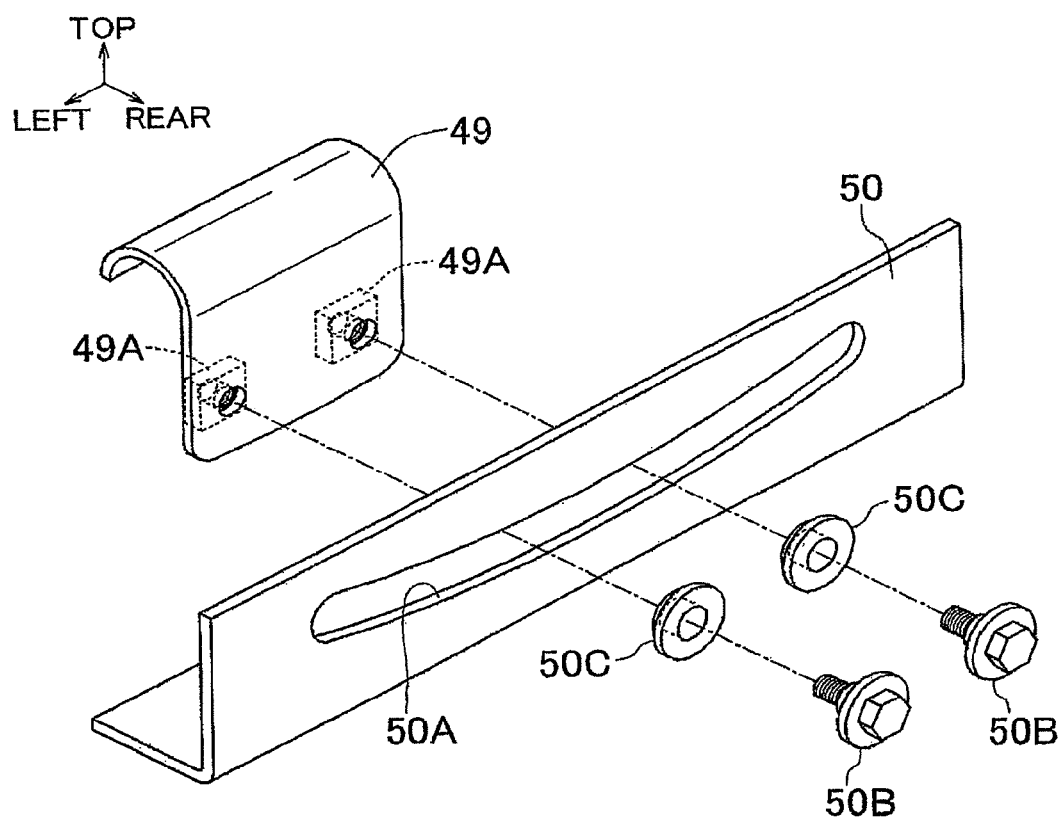
FIG. 10 is a partially enlarged perspective view illustrating a third embodiment of the invention.

A third embodiment of the invention will be described with reference to FIG. 10. The feature of the third embodiment is that the rear portion of the support body 40 is rotated, whereas the rear portion of the support body 40 is linearly moved in the first embodiment. The other feature of the third embodiment is that the rear portion of the support body 40 is supported at two points, whereas the rear portion of the support body 40 is supported with respect to the fixed bracket 44 at one point in the first embodiment. The other portions of the configuration in the third embodiment are the same as those in the first embodiment. The same portions are denoted by the same reference numerals or signs, and the repeated description thereof will be omitted. In FIG. 10 as well, arrows indicate the directions when the vehicle seat is provided in the vehicle. A fixed bracket 49 (refer to FIG. 10) is fixed to the rear pipe 13 (refer to FIG. 1) by welding, in the manner similar to the manner in which the fixed bracket 44 is fixed to the rear pipe 13 in the first embodiment. A spring bracket 50 (refer to FIG. 10) is connected to a rear end portion of the support body 40 (refer to FIG. 1). A pair of weld nuts 49A is respectively fixed to right and left side portions in a portion of the fixed bracket 49, the portion being located behind the rear pipe 13, and extending downward. Further, a sliding hole 50A with an arc shape, which is similar to the sliding hole 48A (refer to FIG. 9) of the fixed bracket 48 in the second embodiment, is provided in an upper-side portion of the spring bracket 50 with an L-shaped cross-section. A pair of stepped bolts 50B extends through the sliding hole 50A, and the stepped bolts 50B are fastened to the weld nuts 49A, respectively. At this time, a bush 50C is disposed between each stepped bolt 50B and an edge portion around the sliding hole 50A of the spring bracket 50, to decrease the friction resistance between the stepped bolt 50B and the edge portion around the sliding hole 50A. Thus, when the support body 40 is rotated in the right-left direction, the spring bracket 50 is supported by the pair of stepped bolts 50B, and is swung in an are along the sliding hole 50A. When the swing width of the support body 40 in the third embodiment is set to be equal to the swing width of the support body 40 in the second embodiment, the width of the sliding hole 50A in the right-left direction needs to be set to be larger than the width of the sliding hole 48A in the right-left direction. The difference between the widths of the sliding hole 50A and the sliding hole 48A is caused due to the fact that when the support body 40 is swung, the pair of stepped bolts 50B slides in the sliding hole 50A, whereas the one stepped bolt 48B slides in the sliding hole 48A. The width of the sliding hole 50A in the right-left direction is set to be larger than the width of the sliding hole 48A in the right-left direction by a length equivalent to a distance between the pair of stepped bolts 50B.

In the vehicle seat with the above-described configuration, as in the first embodiment, when the occupant seated on the seat cushion swings his or her upper body to the right and left, the front end portion of the support body 40 is rotated about the stepped hinge pin 41A serving as the rotation center, and the rear end portion of the support body 40 is swung (moved) along the arc shape of the sliding hole 50A. Accordingly, the movable portion 22 of the cushion pad 20 is also swung. Thus, as in the first and second embodiments, the massaging effect on the buttocks of the occupant P is obtained, and the blood circulation in the buttocks of the occupant P is promoted. Accordingly, it is possible to suppress an increase in the degree of tiredness of the body of the occupant P. Further, the occupant P can easily move his or her upper body as if the occupant P used an exercise machine, and therefore, the blood circulation of the body is promoted due to the exercise effect, and an increase in the degree of tiredness is suppressed. At this time, the femoral region of the occupant is supported on the fixed portion 21 of the cushion pad 20, and therefore, the occupant can stably maintain the seated posture. In the third embodiment, the spring bracket 50 connected to the rear end portion of the support body 40 is supported by the pair of stepped bolts 50B. Accordingly, the support body 40 is supported at three points including a support point at which the front end portion of the support body 40 is supported by the stepped hinge pin 41A. Thus, the occupant can be stably supported, as compared to the configuration in each of the first and second embodiments, in which the support body 40 is supported at two points. As a result, when the occupant is seated without swinging his or her upper body to the right and left, the upper body is stably supported without being swung to the right and left.

Although the specific embodiments have been described, the invention is not limited to the appearances and the configurations in the embodiments, and various modifications, additions, and deletions may be made without departing from the scope of the invention. For example, in the above-described embodiments, the fixed portion 21 and the movable portion 22 of the cushion pad 20 are formed as one unit. However, the fixed portion 21 and the movable portion 22 may be formed separately, that is, the fixed portion. 21 and the movable portion 22 may be formed as separate bodies. In the above-described embodiments, the fixed portion 21 and the movable portion 22 are formed by respectively providing the cut portions, which extend from the rear side toward the front side, in the right and left side portions of the cushion pad 20, and surfaces defining the cut portions are vertical surfaces. However, the surfaces defining the cut portions may be tilted surfaces that are tilted upward in a direction toward the right side or in a direction toward the left side, and the movable portion 22 may be provided over the entire width of the cushion pad 20 in the right-left direction. In this case, the movable portion 22 and the fixed portion 21 are arranged in a top-bottom direction in each of the right and left side portions of the cushion pad 20. Therefore, when a sitting pressure is applied from an occupant, the fixed portion 21 and the movable portion 22 may directly contact each other. Thus, it is necessary to provide a sliding member between the fixed portion 21 and the movable portion 22 to prevent the direction contact between the fixed portion 21 and the movable portion 22, and to allow the movable portion 22 to move relative to the fixed portion 21. In the above-described embodiments, each of the sliding hole 43A of the spring bracket 43, the sliding hole 48A of the fixed bracket 48, and the sliding hole 50A of the spring bracket 50 has an arc shape. However, each of the sliding hole 43A, the sliding hole 48A, and the sliding hole 50A may have a straight line shape extending in the right-left direction. However, in this case, that is, in the case where the sliding hole 43A, 48A, or 50A has a straight line shape, the support body 40 needs to be deformed so as to be twisted in the right-left direction, because the support body 40 is rotated about the front end side thereof. In the above-described embodiments, the support body 40 includes the S-shaped springs 42. However, the support body 40 may be formed by a plate member, or a stretchable cloth. In the above-described embodiments, the invention is applied to the seat cushion. However, the invention may be applied to a seat back. In the above-described embodiments, the invention is applied to the vehicle seat. However, the invention may be applied to other conveyance seats, such as seats in an airplane, a ship, and a train.

What is claimed is:

1. A conveyance seat comprising:
a seat frame serving as a frame that is configured to support a load of a seated occupant;
a seat pad that is disposed on the seat frame, and configured to flexibly receive the load of the seated occupant; and
a support body disposed in the conveyance seat based on a center portion of a distribution of a sitting pressure applied by the seated occupant to the seat pad when the seated occupant is seated on the seat pad, wherein
the support body is supported with respect to the seat frame such that a front end portion of the support body is rotatable in a right-left direction about a straight line tilted upward in a direction from a front side toward a rear side, and a rear end portion of the support body is movable in the right-left direction,
the seat pad includes a fixed portion that is supported at a fixed position by the seat frame, and a movable portion that is supported by the support body such that the movable portion is movable, and
the support body includes a spring body that is stretched and contracted along a support plane of the support body.

2. The conveyance seat according to claim 1, wherein the straight line, about which the support body is rotatable, intersects with the front end portion of the support body.

3. The conveyance seat according to claim 1, wherein a cut portion, that allows the movable portion to move in accordance with movement of the support body, is provided at a border portion between the fixed portion and the movable portion of the seat pad.

4. A conveyance seat comprising:
a seat frame serving as a frame that is configured to support a load of a seated occupant;
a seat pad that is disposed on the seat frame, and configured to flexibly receive the load of the seated occupant; and
a support body disposed in the conveyance seat based on a center portion of a distribution of a sitting pressure applied by the seated occupant to the seat pad when the seated occupant is seated on the seat pad, wherein
the support body is supported with respect to the seat frame such that a front end portion of the support body is rotatable in a right-left direction about a straight line tilted upward in a direction from a front side toward a rear side, and a rear end portion of the support body is movable in the right-left direction,
the seat pad includes a fixed portion that is supported at a fixed position by the seat frame, and a movable portion that is supported by the support body such that the movable portion is movable, and
the support body includes a spring bracket, and a fixed bracket that is fixed to the seat frame, and
a sliding hole is provided in one of the spring bracket and the fixed bracket, and the spring bracket is connected to the fixed bracket such that the spring bracket is movable in the right-left direction, and at least one bolt extends through the sliding hole.

5. The conveyance seat according to claim 4, wherein the sliding hole has an arc shape, and extends in the right-left direction.

6. The conveyance seat according to claim 4, wherein the straight line, about which the support body is rotatable, intersects with the front end portion of the support body.

7. The conveyance seat according to claim 4, wherein a cut portion, that allows the movable portion to move in accordance with movement of the support body, is provided at a border portion between the fixed portion and the movable portion of the seat pad.

* * * * *